United States Patent
Hagen

(10) Patent No.: US 8,298,428 B2
(45) Date of Patent: Oct. 30, 2012

(54) CLEANING MAGNET DEVICE FOR CLEANING DRILLING FLUID

(75) Inventor: Karluf Hagen, Randaberg (NO)

(73) Assignee: Innovar Engineering AS, Sola (NO)

( * ) Notice: Subject to any disclaimer, the term of this patent is extended or adjusted under 35 U.S.C. 154(b) by 0 days.

(21) Appl. No.: 12/937,613

(22) PCT Filed: Apr. 15, 2009

(86) PCT No.: PCT/NO2009/000143
§ 371 (c)(1),
(2), (4) Date: Jan. 21, 2011

(87) PCT Pub. No.: WO2009/128727
PCT Pub. Date: Oct. 22, 2009

(65) Prior Publication Data
US 2011/0309009 A1    Dec. 22, 2011

(30) Foreign Application Priority Data

Apr. 17, 2008    (NO) .................................. 20081856

(51) Int. Cl.
*B01D 35/06* (2006.01)
(52) U.S. Cl. ..... 210/695; 210/222; 210/223; 209/223.1; 166/357
(58) Field of Classification Search .................. 210/222, 210/223, 695; 294/65.5, 190; 15/220.2; 175/66; 166/357; 209/215, 223.1
See application file for complete search history.

(56) References Cited

U.S. PATENT DOCUMENTS

| | | | |
|---|---|---|---|
| 1,561,077 A * | 11/1925 | Hirsch | 446/137 |
| 2,792,115 A | 5/1957 | Medearis | |
| 3,296,645 A * | 1/1967 | Shore | 15/220.2 |
| 3,636,568 A * | 1/1972 | Stuner | 2/161.6 |
| 3,938,971 A * | 2/1976 | McClure | 55/300 |
| 4,977,637 A * | 12/1990 | Demers | 15/104.001 |
| 5,217,610 A * | 6/1993 | McClain et al. | 210/223 |
| 5,273,193 A * | 12/1993 | Murakami et al. | 222/189.06 |
| 6,706,178 B2 | 3/2004 | Simonson | |
| 7,329,342 B2 * | 2/2008 | Faria | 210/167.03 |
| 7,350,409 B2 | 4/2008 | Klatt | |
| 7,681,276 B2 * | 3/2010 | Rothweil et al. | 15/210.1 |
| 2002/0144545 A1 | 10/2002 | Cesmat et al. | |

FOREIGN PATENT DOCUMENTS

| | | |
|---|---|---|
| CA | 2631974 | 1/2007 |
| EP | 1149632 | 10/2001 |
| NO | 311588 | 10/1995 |
| WO | WO0234653 | 5/2002 |

OTHER PUBLICATIONS

International Search Report prepared by the European Patent Office on Jul. 16, 2009, for International Application No. PCT/NO2009/000143.
Written Opinion prepared by the European Patent Office on Jul. 16, 2009, for International Application No. PCT/NO2009/000143.
International Preliminary Report on Patentability prepared by the European Patent Office on Jul. 16, 2009, for International Application No. PCT/NO2009/000143.

* cited by examiner

*Primary Examiner* — Tony G Soohoo
*Assistant Examiner* — David C Mellon
(74) *Attorney, Agent, or Firm* — Sheridan Ross P.C.

(57) ABSTRACT

A cleaning magnet device (1a-1c) for cleaning drilling fluid, the cleaning magnet (1a-1c) being disposed in a liquid flow, and the cleaning magnet (1a-1c) being provided with a removable material (6) which is arranged to prevent magnetic bodies from accumulating directly on the cleaning magnet (1a-1c).

10 Claims, 1 Drawing Sheet

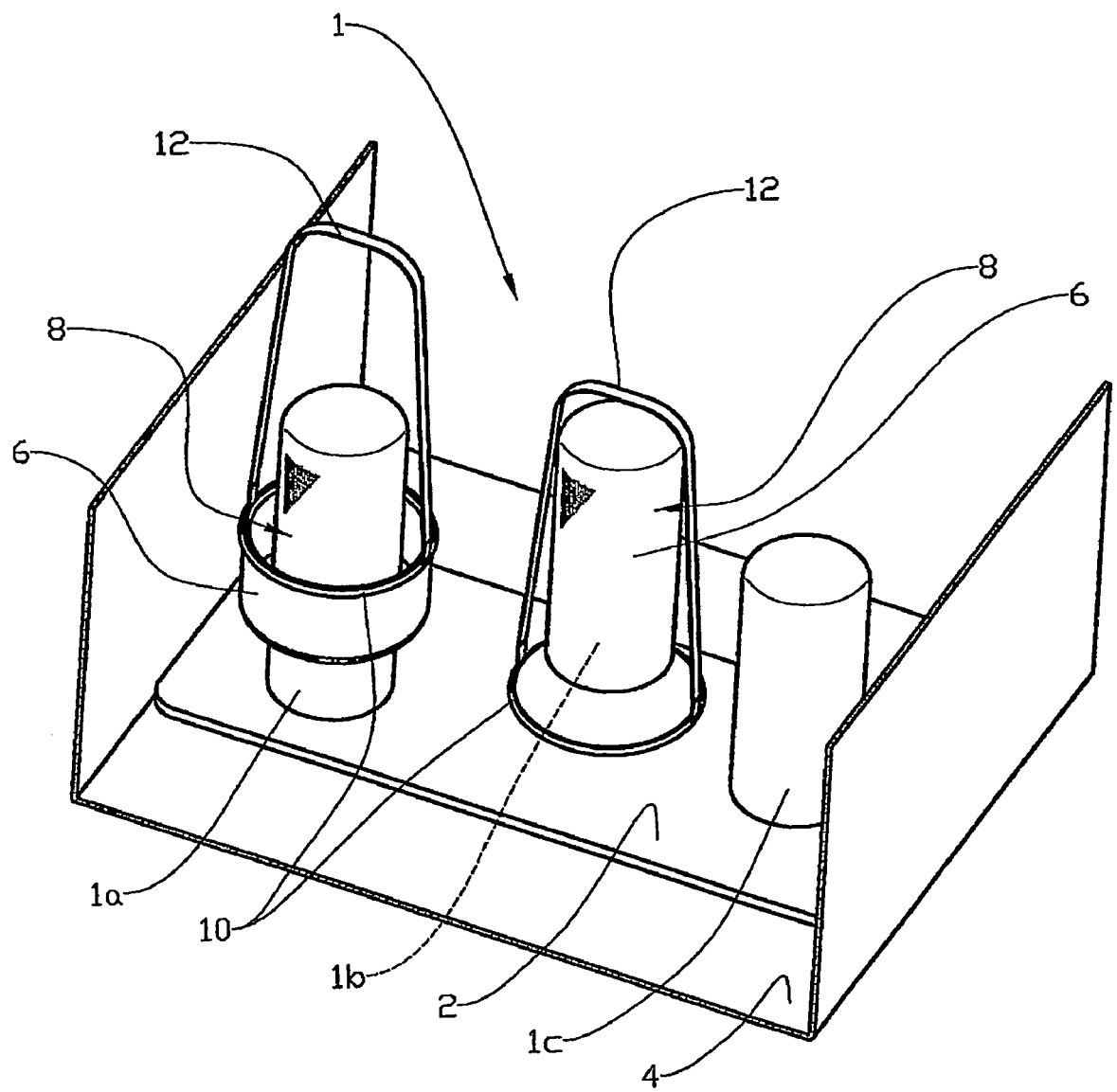

CLEANING MAGNET DEVICE FOR CLEANING DRILLING FLUID

CROSS REFERENCE TO RELATED APPLICATIONS

This application is a national stage application under 35 U.S.C. 371 of PCT Application No. PCT/NO2009/000143 having an international filing date of 15 Apr. 2009, which designated the United States, the PCT application claiming the benefit of Norway Patent Application No. 20081856 filed 17 Apr. 2008, the entire disclosure of each application is incorporated herein by reference.

A cleaning magnet is provided. More particularly, it is a cleaning magnet for cleaning drilling fluid, the cleaning magnet being placed in a liquid flow.

During drilling operations in the ground, during which, for example, a drill string wears against a casing, the drilling mud will get some magnetic bodies added to it, mainly in the form of iron chips.

Iron chips subject pumps and valves to extra abrasion and it is therefore usual to place relatively powerful magnets at the bottom of a fluid channel in which the drilling fluid flows as it returns from a borehole.

These magnets must be cleaned from time to time, which involves work in a partly uncomfortable and harmful environment.

It is known to place magnet rods in the fluid channel, the magnet rods, which extend down into the fluid channel, being attached to a holder. The holder with magnet rods is arranged to be lifted out of the fluid channel for cleaning.

As it is necessary to use relatively powerful magnets which are thereby also heavy, the lifting operation may be demanding both because of the weight to be handled but also because of the magnetic forces prevailing. The same magnetic forces also contribute to making the cleaning work itself difficult.

From the document CA 2631974 it is known to place magnets for separating material from drilling fluid in a nonmagnetic casing. By pulling the magnet out of the casing, the separated material which is on the casing falls off the casing and may then be collected. However, this does not solve problems which are connected to a harmful environment.

The invention has for its object to remedy or reduce at least one of the drawbacks of the prior art.

The object is achieved according to the invention through the features which are specified in the description below and in the claims that follow.

A cleaning magnet for the cleaning of drilling fluid is provided, the cleaning magnet being placed in a liquid flow and being characterized by the cleaning magnet being provided with a removable material, the material being arranged to prevent magnetic bodies from accumulating directly on the cleaning magnet.

An aspect of the cleaning magnet is that it is in a fluid channel.

Yet another aspect of the cleaning magnet is that it projects upwards and has a free, upper end portion.

A further aspect of the cleaning magnet is that the material forms a sleeve which may be made of a synthetic material.

Yet another aspect of the cleaning magnet is that the material forms a closed stocking which may be made of, for example, a synthetic fibre cloth.

A further aspect of the cleaning magnet is that, at its open portion, the stocking is surrounded, at least partially, by a weight mass. With advantage, the weight mass is formed by a non-magnetic metal ring.

A further aspect of the cleaning magnet is that at its open portion, the stocking is provided with a lifting tool which projects above the cleaning magnet.

A further aspect of the cleaning magnet is that the lifting tool is connected to the weight mass.

By removing the material from the cleaning magnet, the magnetic bodies will be carried along by the material, thereby cleaning the cleaning magnet in a simple and clean manner. After the material has been cleaned, it may again be arranged around the cleaning magnet, possibly be replaced with new material.

In a preferred embodiment, when the material forms a closed stocking provided, at its open end portion, with an annular weight mass, the material may easily be slipped down over the cleaning magnet.

The lifting tool which is formed in this preferred embodiment by a relatively rigid bail is connected to the weight mass and projects above the cleaning magnet.

By gripping the lifting tool and lifting, the weight mass is lifted upwards while, at the same time, the material folds and turns inside out, so that magnetic bodies will stay in the material as it is lifted away, the material then forming a bag.

Thus, the device provided substantially facilitates the work of removing magnetic bodies from the cleaning magnet.

In what follows is described an example of a preferred embodiment which is visualized in the accompanying drawing, in which:

FIG. 1 shows cleaning magnets which are disposed in a fluid channel.

In the drawings the reference numeral 1 indicates a magnet assembly including a first cleaning magnet 1a, a second cleaning magnet 1b and a third cleaning magnet 1c, the cleaning magnets 1a-1c being connected to a supporting plate 2.

The magnet assembly 1 is disposed in a fluid channel 4 for drilling fluid. FIG. 1 shows a section of the fluid channel 4.

In FIG. 1, the third cleaning magnet 1c is shown, for illustrative reasons, without a surrounding material 6. The second cleaning magnet 1b is surrounded by a material 6 in the form of a closed stocking 8 which is provided, at its open portion, with a weight mass 10 in the form of a nonmagnetic metal ring. The weight mass 10 contributes to holding the stocking 8 in its position of use as it is shown for the second cleaning magnet 1b in FIG. 1.

A lifting tool 12 in the form of a bail which is connected to the weight mass 10 projects above the second cleaning magnet 1b.

The stocking 8 surrounding the first cleaning magnet 1a is in the course of being lifted away from the first cleaning magnet 1a. The material 6 is here being rolled off the first cleaning magnet 1a, whereby magnetic bodies, which have been attracted to the first cleaning magnet 1a from the drilling fluid, will remain in the stocking 8 as the stocking is being moved up along the first cleaning magnet 1a.

A new stocking may then be slipped down on the first cleaning magnet 1a.

The invention claimed is:

1. A cleaning apparatus for removing magnetic bodies from a liquid flow of drilling fluid, said apparatus comprising:
   a fluid channel for containing the liquid flow of drilling fluid; and
   at least one cleaning magnet attached to the fluid channel for engaging the liquid flow, and for attracting magnetic bodies in the liquid flow when flowing through the fluid channel;
   wherein said cleaning magnet projects upwards in the fluid channel and has a free upper end portion;

wherein the cleaning magnet is provided with a removable material forming a closed stocking surrounding the magnet and being open at a lower end portion thereof, thereby allowing for easy mounting of the stocking onto the magnet, thereby also allowing for easy removal of the stocking from the magnet upon accumulation of magnetic bodies thereon, said open and lower end portion is provided with a bail projecting above the cleaning magnet; and wherein said open and lower end portion of the removable stocking is surrounded, at least partly, by a weight mass for holding the stocking in place in the fluid channel and in said liquid flow when operational.

2. The cleaning apparatus in accordance with claim 1, wherein the stocking forms a sleeve.

3. The cleaning apparatus in accordance with claim 1, wherein the bail is connected to the weight mass.

4. The cleaning apparatus in accordance with claim 1, wherein the cleaning magnet is connected to a supporting plate in said fluid channel.

5. A method of removing magnetic bodies from a liquid flow of drilling fluid, said method comprising:

attaching at least one cleaning magnet to a fluid channel;

arranging said cleaning magnet to project upwards in the fluid channel and to have a free upper end portion;

providing the cleaning magnet with a removable material forming a closed stocking surrounding the magnet and being open at a lower end portion thereof;

providing the open and lower end portion of the removable stocking with a weight mass surrounding, at least partly, said lower end portion, thereby weighing down the stocking and, hence, holding the stocking in place when operational;

passing said liquid flow of drilling fluid through the fluid channel so as to engage said cleaning magnet in the fluid channel, thereby allowing the cleaning magnet to attract magnetic bodies in the liquid flow, thereby also allowing the magnetic bodies to accumulate on the removable stocking surrounding the cleaning magnet; and removing the stocking from the cleaning magnet, thereby also removing magnetic bodies accumulated on the stocking.

6. The method in accordance with claim 5, further comprising slipping a clean stocking down onto the cleaning magnet in the fluid channel.

7. The method in accordance with claim 5, wherein removing the stocking from the cleaning magnet comprises removing the stocking by lifting it away from the cleaning magnet.

8. The method in accordance with claim 7, further comprising connecting said open and lower end portion of the stocking to a lifting tool projecting above the cleaning magnet.

9. The method in accordance with claim 8, further comprising connecting the lifting tool to said weight mass.

10. The method in accordance with claim 8, further comprising simultaneously folding the stocking inside out so as to form a bag when lifting the stocking up along the cleaning magnet, whereby the magnetic bodies remain in the bag as the stocking is lifted up and away from the cleaning magnet.

\* \* \* \* \*